United States Patent
Gupta et al.

(10) Patent No.: US 8,302,187 B1
(45) Date of Patent: Oct. 30, 2012

(54) SYSTEM AND METHOD FOR PREVENTING LARGE-SCALE ACCOUNT LOCKOUT

(75) Inventors: Diwakar Gupta, Seattle, WA (US);
Philip Yuen, Bellevue, WA (US);
Chih-Jen Huang, Kirkland, WA (US);
Gerald Yuen, Pasadena, CA (US)

(73) Assignee: Amazon Technologies, Inc., Reno, NV (US)

( * ) Notice: Subject to any disclaimer, the term of this patent is extended or adjusted under 35 U.S.C. 154(b) by 1156 days.

(21) Appl. No.: 11/862,979

(22) Filed: Sep. 27, 2007

(51) Int. Cl.
*H04L 29/06* (2006.01)

(52) U.S. Cl. .................. 726/22; 726/3; 726/28; 713/182

(58) Field of Classification Search .............. 726/3, 22, 726/28; 713/182
See application file for complete search history.

(56) References Cited

U.S. PATENT DOCUMENTS

| | | | | |
|---|---|---|---|---|
| 5,550,968 A * | 8/1996 | Miller et al. | ................. | 715/741 |
| 5,613,012 A | 3/1997 | Hoffman et al. | | |
| 5,699,514 A * | 12/1997 | Durinovic-Johri et al. | ..... | 726/19 |
| 5,802,499 A | 9/1998 | Sampson et al. | | |
| 5,928,363 A | 7/1999 | Ruvolo | | |
| 5,937,396 A | 8/1999 | Konya | | |
| 5,949,044 A | 9/1999 | Walker et al. | | |
| 5,956,700 A | 9/1999 | Landry | | |
| 6,202,158 B1 * | 3/2001 | Urano et al. | ..................... | 726/22 |
| 6,223,985 B1 * | 5/2001 | DeLude | ........................ | 235/382 |
| 6,381,631 B1 * | 4/2002 | van Hoff | ....................... | 709/202 |
| 6,394,907 B1 | 5/2002 | Rowe | | |
| 6,751,733 B1 * | 6/2004 | Nakamura et al. | ............ | 713/182 |
| 6,959,394 B1 * | 10/2005 | Brickell et al. | ................... | 726/5 |
| 7,032,026 B1 * | 4/2006 | Biswas et al. | ................. | 709/229 |
| 7,110,954 B2 | 9/2006 | Yung | | |
| 7,139,694 B2 | 11/2006 | Horn et al. | | |
| 7,328,841 B1 * | 2/2008 | Frenklakh | ....................... | 235/380 |
| 7,386,103 B1 * | 6/2008 | Chahal | ........................ | 379/88.23 |
| 7,669,229 B2 * | 2/2010 | Grobman | .......................... | 726/2 |
| 8,141,127 B1 * | 3/2012 | Mustafa | ............................. | 726/1 |
| 2003/0103627 A1 * | 6/2003 | Nierzwick et al. | ............. | 380/240 |
| 2003/0120937 A1 * | 6/2003 | Hillis et al. | .................... | 713/189 |
| 2004/0078326 A1 * | 4/2004 | Strydom et al. | ................. | 705/39 |
| 2004/0254868 A1 * | 12/2004 | Kirkland et al. | ................ | 705/35 |
| 2006/0015938 A1 * | 1/2006 | Wlodarczyk | .................. | 726/22 |

(Continued)

FOREIGN PATENT DOCUMENTS

KR     2001028529 A  *  4/2001

*Primary Examiner* — Michael Pyzocha
(74) *Attorney, Agent, or Firm* — Robert C. Kowert; Meyertons, Hood, Kivlin, Kowert & Goetzel, P.C.

(57) ABSTRACT

Various embodiments of a system and method for preventing large-scale account lockout are described. The system and method for preventing large-scale account lockout may include an account access control component configured to prevent fraudulent individuals from locking access to user accounts. The account access control component may lock access to an account after a lockout threshold is tripped. To prevent an account from being locked by fraudulent individuals, the account access control component may utilize a warning threshold. When the account access control component detects a number of incorrect authorization attempts equal to the warning threshold, the control component may perform various actions to prevent a fraudulent individual from locking an account holder's account, including, but not limited to, contacting the account holder through a registered communication channel to inform the user that the warning threshold has been reached or placing the account holder's account in a particular hold state.

21 Claims, 8 Drawing Sheets

U.S. PATENT DOCUMENTS

| | | | |
|---|---|---|---|
| 2006/0041756 A1* | 2/2006 | Ashok et al. | 713/183 |
| 2006/0179057 A1* | 8/2006 | Moretti | 707/9 |
| 2007/0124211 A1 | 5/2007 | Smith | |
| 2007/0256139 A1* | 11/2007 | Gaos et al. | 726/26 |
| 2008/0040257 A1* | 2/2008 | Nafeh et al. | 705/37 |
| 2008/0072283 A1* | 3/2008 | Relyea et al. | 726/2 |
| 2008/0313721 A1* | 12/2008 | Corella | 726/6 |
| 2009/0019118 A1* | 1/2009 | Jones et al. | 709/206 |
| 2009/0046858 A1* | 2/2009 | Iyer et al. | 380/259 |
| 2009/0320107 A1* | 12/2009 | Corella | 726/6 |

* cited by examiner

SYSTEM AND METHOD FOR PREVENTING LARGE-SCALE ACCOUNT LOCKOUT

BACKGROUND

Typically, individuals have access to a multitude of user accounts associated with the personal and business aspects of their lives. Such accounts may include, but are not limited to, bank accounts, credit accounts, electronic mail ("email") accounts, telephone accounts, insurance accounts, and other accounts associated with goods or services utilized by an individual. Individuals may access their accounts to obtain information about the current status of their account. For instance, an individual may access a bank account to determine their current balance or to view recent activity associated with the account. Individuals may also access their accounts to perform a variety of functions. For instance, a user may access an email account to send an email to a colleague or access an online customer account to purchase goods or services.

Many user accounts include mechanisms for account authorization in order to prevent account access by unauthorized individuals. For instance, a user may be required to provide a correct username and password combination before accessing an account. In some cases, security mechanisms that protect user accounts may impose limits on the number of authorization attempts for a particular account. For instance, after a certain number of incorrect authorization attempts, access to the user account may be locked. In many cases, locking access to a user account in this manner may prevent fraudulent individuals from gaining access to an account through brute force techniques, such as repeatedly attempting different username and password combinations until a match is found.

Figure 1:
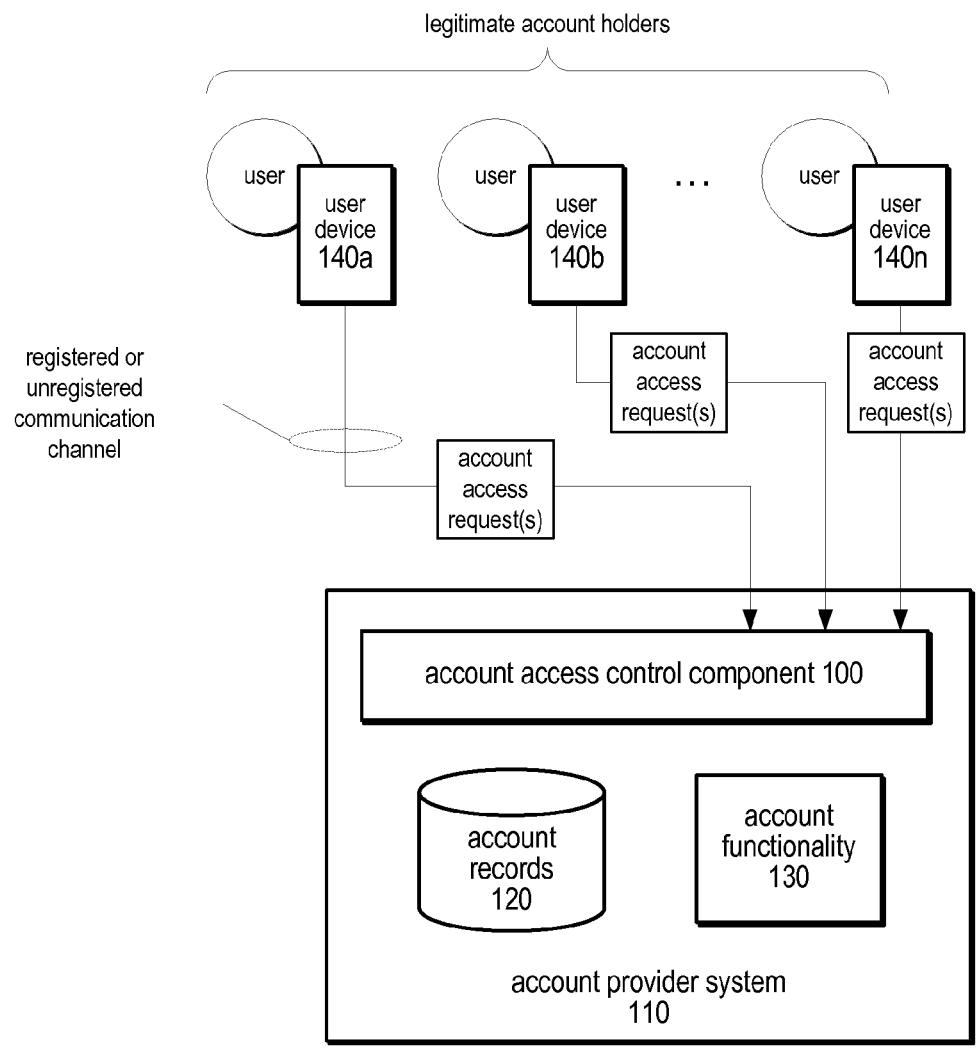
FIG. 1 illustrates an account access control component configured to prevent large-scale account lockout, according to one embodiment.

While the system and method for preventing large-scale account lockout is described herein by way of example for several embodiments and illustrative drawings, those skilled in the art will recognize that the system and method for preventing large-scale account lockout is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for preventing large-scale account lockout as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for preventing large-scale account lockout are described. The system and method for preventing large-scale account lockout may include an account access control component configured to prevent fraudulent individuals from locking access to user accounts. In various embodiments, the account access control component may be configured to prevent access to a user account after a particular number of incorrect authorization attempts have been detected. This particular number of incorrect authorization attempts may be referred to herein as a "lockout threshold". Additionally, preventing access to a user account may be referred to herein as "locking" the user account.

To prevent fraudulent individuals from intentionally locking accounts of legitimate account holders (e.g., by repeatedly supplying incorrect account verification information, such as incorrect passwords or incorrect personal identification numbers), the account access control component may be configured to provide a "warning threshold," which may be a particular number of incorrect authorization attempts less than or equal to the lockout threshold. Incorrect authorization attempts may originate from a legitimate account holder (e.g., the account holder may forget his password) or from a fraudulent individual (e.g., an attacker performing a brute force attack). When the account access control component detects a number of incorrect authorization attempts equal to the warning threshold, the account access control component may perform a variety of actions to prevent a fraudulent individual from locking a legitimate account holder's account. Such actions may include contacting the account holder through a registered communication channel to inform the user that the threshold has been reached. The registered communication channel may be a communication channel previously registered by the user for the account. For instance, during an account setup process that occurs before use of the account access control component, the account holder may provide information that enables the account access control component to reliably contact the account holder. For instance, the user may register a phone number, email address, or other contact information that enables the account access control component to contact the account holder. In this way, whether the warning threshold is triggered by incorrect authorization attempts originating from a legitimate user (e.g., the account holder associated with the account), by incorrect authorization attempts originating from a fraudulent user, or by some combination thereof, the account access control component may alert the account holder that the warning threshold has been reached for his account. Various other actions may be performed in addition to (or instead of) alerting the account holder, such as placing the account in a hold state, as demonstrated by the various descriptions presented herein.

FIG. 1 illustrates an account access control component according to one embodiment. Account access control component 100 may be configured to manage access to one or more user accounts by one or more users. Account access control component may in various embodiments be implemented within an account provider system, such as account provider system 110. Account provider system 110 may manage account records (e.g., transaction records, records of products purchased, account balances for financial accounts, contact information, balances due, investment performance, and other types of information that may be accessible through a user's account) for one or more user accounts, such as account records 120. Account provider system 110 may be configured to provide account functionality, represented logically as account functionality 130. Account functionality 130 may enable a user to perform a variety of account related functions, such as transfer funds from one entity to another, make a purchase, manage investments, pay bills, and other account-related actions). Account access control component 100 may manage user access to account records 120 or account functionality 130 associated with a variety of accounts. Such accounts may include, but are not limited to, transaction-based accounts, bank accounts, credit accounts, telecommunications-related accounts, investment accounts, insurance accounts, customer accounts, and/or travel accounts.

To access account records or account functionality, legitimate account holders may provide an account access request to account access control component 100, such as illustrated by the requests sent from user devices 140a-140n to the account access control component. Each user device may be any of various systems capable of supporting communication between two or more entities. Examples of such user devices include, but are not limited to, telephones (e.g., mobile or landline), computer systems (e.g., a desktop or laptop computer system), personal digital assistants (PDAs), two-way pagers, and/or smartphones.

Each account access request may include authorization information such that account access control component 100 may determine whether to provide the user access to a user account managed by the account provider system. In the illustrated embodiment, each user is a legitimate account holder and each account access request includes correct authorization information. Such authorization information may include personal identification numbers (PINs), usernames, passwords, security codes, other security related mechanisms, or some combination thereof. For each account access request, the account access control component may be configured to provide account access (e.g., access to account records and/or account functionality) to the respective user if the account access request includes the correct authorization information for the particular account. For example, the account access request sent from user device 140a may include a correct username and password combination. Accordingly, account access control component may provide the respective user with access to his account.

In various cases, an account access request may include one or more account identifiers for a particular account. For instance, a particular account's account identifier may be an identifier assigned to the account during an account registration process (e.g., an identifier assigned by the account access control component), an identifier chosen by the account's user (e.g., a username), an identifier associated with the user device from which the request is initiated (e.g., a serial number or network address), or any other identifier that identifies the account. In various embodiments, one type of account identifier may be a caller identification ("caller ID") record that indicates a phone number of a telephone line from which the account access request is initiated. For example, if the account access request is placed via telephone, the account access control component may be configured to determine a user's account from the caller ID record. For instance, the caller ID record may indicate a phone number registered by the account holder with the account access control component (or the account provider system).

In various embodiments, communications between user devices and the account access control component may occur through registered or unregistered communication channels. In the illustrated embodiment, each account access request may be sent through a registered communication channel or an unregistered communication channel. Note that any particular communication method (e.g., telephone communication, email correspondence, and/or network based communication) may have multiple communication channels. Examples of communication channels may include communications between a first telephone line having a first number (e.g., an account holder's telephone number) and a second telephone line having a second number (e.g., a customer service number associated with the user's account). In another example, a communication channel may include communications between two particular email accounts.

Registered communication channels may include channels that are designated by the account holder. For instance, during a registration process with the account access control component (or the account provider system), the user may specify a phone number or email address to which communications may be directed. For example, the account holder may register his home telephone number and his mobile phone number with the account access control component. Accordingly, the account holder may communicate with the account access control component through multiple communication channels (e.g., a communication channel associated with the home telephone number and a communication channel associated with the mobile phone number) that are of the same communication method (e.g., telephone communication). To prevent communications with fraudulent individuals, the account access control component may in some embodiments primarily contact account holders through registered communication channels. Note that registered communication channels are typically only accessible to the account holder or an individual that the account holder likely trusts (e.g., a family member that shares a home phone number with the individual).

Account holders may contact the account access control component through unregistered communication channels (e.g., from an unregistered telephone number or an unregistered email address). However, in such cases, the account access control component may in some embodiments require the account holder to provide more verification or security information than is required when communicating through a registered communication channel. For instance, in one case, the account holder may send an account access request to the account access control component from a registered telephone number (which may be determined by the account access control component from the caller ID). In response, the account access control component may require the user to provide a PIN number. However, in another case, the account holder may send an account access request to the account access control component from an unregistered telephone number (e.g., a communication initiated from a public telephone). In this case, the account access control component may require that the account holder provide both an account identifier (e.g., a username) and a PIN (and/or a password).

Figure 2:
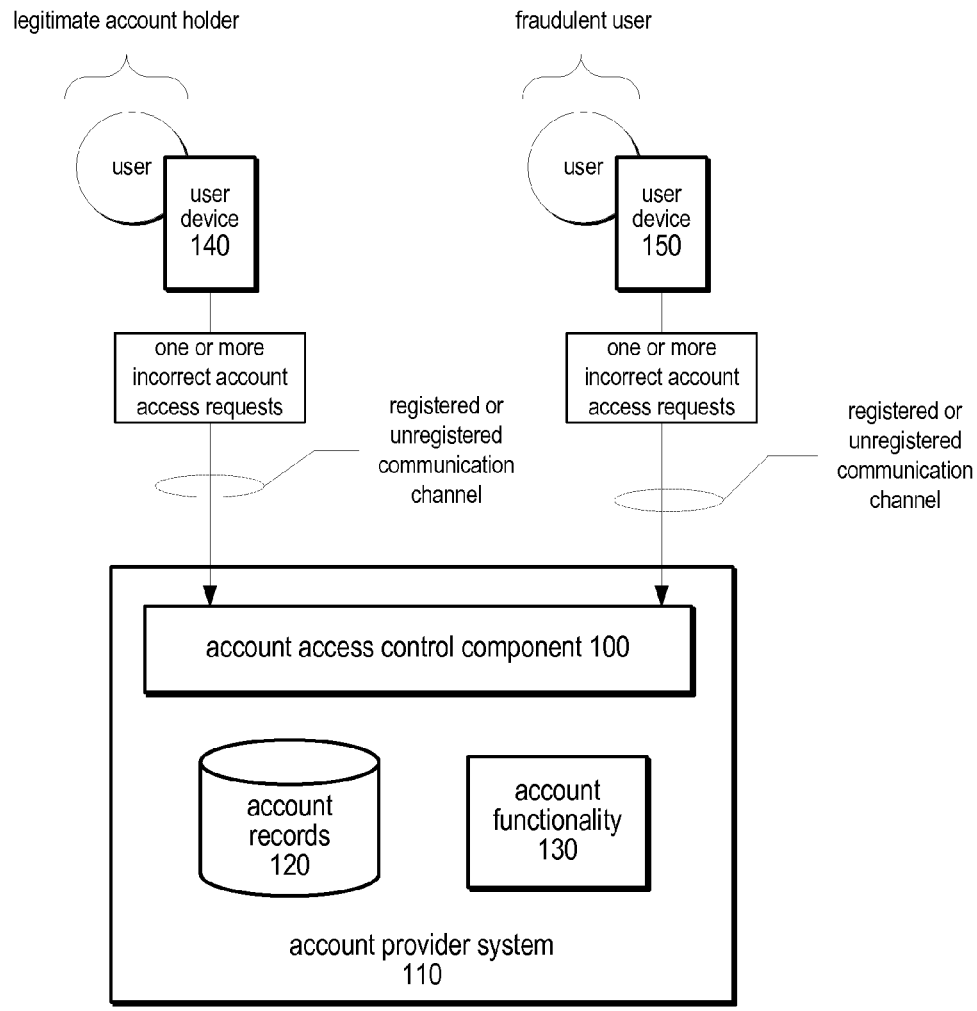
FIG. 2 illustrates an account access control component configured to prevent large-scale account lockout, according to one embodiment.

While FIG. 1 illustrates how the account access control component manages correct account access requests, FIG. 2 illustrates how account access control component 100 may manage incorrect account access requests as well as requests from fraudulent users, according to one embodiment. In the illustrated embodiment, only one legitimate account holder and one fraudulent user are illustrated for the purpose of clarity. However, account access control component may in various embodiments interface with one or more legitimate account holders and/or one or more fraudulent users.

In the illustrated embodiment, account access control component 100 may receive one or more incorrect account access requests. An incorrect account access request may include any request that indicates incorrect authorization information. For example, the incorrect account access requests sent from user device 140 to the account access control component may include an incorrect PIN, incorrect password, and/or an incorrect security code. Similarly, the incorrect account access requests sent from user device 140 to the account access control component may include an incorrect PIN, incorrect password, and/or an incorrect security code. Whether sent from a legitimate account holder or a fraudulent user, incorrect access requests may be logged for each user account provided by the account provider system. For a particular account, the account access control component 100 may provide and manage a count that indicates the number of incorrect account access requests received for the account. For instance, the account access control component may increment a respective account's count each time an incorrect account access request is received for the account. For example, if the account access control component receives an account access request that includes an account identifier for an account (e.g., a username or a phone number indicated by caller ID) and a password that does not match the correct password for the account, the account access control component may increment the count for the particular account. In this way, the account access control component may dynamically update the count such that the count indicates an up-to-date number of incorrect access requests that have been received for a particular account. Note that the count may indicate the number of incorrect access attempts received for a particular account whether the requests are received from legitimate account holders (e.g., the user of user device 140) or fraudulent users (e.g., the user of user device 150).

Account access control component 100 may also manage one or more count thresholds and perform various actions based on whether such thresholds are met. In one embodiment, account access control component 100 may manage a lockout threshold that indicates a particular number of received incorrect account access requests for a particular account. When the number of received incorrect account access requests reaches the lockout threshold, the account access control component may utilize a lockout component to lock access to the particular account. In some embodiments, locking access to a particular account may include preventing all users (with, in some cases, the exception of an authorized system administrator), including legitimate account holders and fraudulent users alike, from accessing the account. This functionality of account access control component 100 may protect user accounts from brute force attacks (e.g., dictionary or war dialing attacks). Such attacks might include a fraudulent individual or attacker repeatedly trying different passwords, PINS, and/or other authorization codes for a particular user account in order to gain access to the account. When access to an account is locked after the account's lockout threshold is tripped, the account access control component 100 may reject or ignore account access requests for the account, thereby warding off additional requests sent as part of a brute force attack on the account. In some cases, an account holder can unlock a locked account by contacting the account provider and providing information (e.g., passwords, passcodes, PINS, Social Security Number, mother's maiden name, and/or other authorization information) and/or a security token (e.g., data from a smart card) to the account provider. In some cases, the amount of authorization information required to unlock a locked account may be more than the amount of authorization information required to access the account when in an unlocked state. For example, a particular account may in some embodiments be accessed with a username and password. However, if the same account is locked, a username, a password, and a security code may be required to unlock the account.

In some cases, the process of unlocking a locked account may be time consuming and inconvenient for the account holder. For instance, the user may need to lookup authorization information that he does not remember from personal records. In some cases, such records may not be readily available or even lost, thereby further inconveniencing the account holder. Since unlocking a locked account may be time consuming or inconvenient to a user, fraudulent individuals that want to disrupt the activity of an entire account provider system may in some cases perform a brute force attack or similar attack designed to purposely trip the lockout threshold for multiple (possibly all) user accounts provided by the account provider system. For instance, a fraudulent individual, such as the user of device 150, may intentionally submit multiple incorrect account access requests for each account provided by the account provider system. For example, the fraudulent individual might use a war dialing technique (e.g., trying every possible account identifier) for submitting incorrect account access requests. For each account access request, the fraudulent individual might pair an account identifier with a traditionally unpopular password (or PIN or passcode) in order to increase the chance that the account access request produces a count increment. Examples of a traditionally unpopular password may include, but are not limited to, passwords that do not contain words typically found in dictionaries or passwords that include non-traditional characters. The fraudulent individual might attempt to create a large-scale lockout (e.g., a situation where multiple, possibly all, of the user accounts are locked) by rapidly submitting incorrect authorization requests for multiple accounts such that the lockout threshold for each (or many) of the accounts is tripped.

In one embodiment, when submitting incorrect account access requests to the account access control component, a fraudulent user may "spoof" caller ID information such that a particular account access request appears to originate from a legitimate account holder when in reality the request originated from the fraudulent user. For instance, spoofing may include utilizing software and/or hardware mechanisms to replace legitimate caller ID information with counterfeit caller ID information. As described above, the account access control component may in some embodiments determine a particular user account from caller ID information indicated by an account access request. Accordingly, to perform the attacks described above, a fraudulent individual may in some cases utilize a single telephone line to spoof caller ID information indicating multiple different phone numbers (and thus multiple different user accounts) for multiple incorrect account access requests. Similar spoofing techniques may in some case be attempted for other communication methods such as email and text messaging (e.g., Short Message Service (SMS)).

To combat (and, in some cases, completely mitigate) the account access control component's vulnerability to such large-scale lockout attacks, the account access control component may manage a warning threshold for each account as well as perform various actions when such warning thresholds are tripped, as described herein. The warning threshold may in some embodiments indicate a number of received incorrect account access requests that is less than or equal to the lockout threshold. Accordingly, the warning threshold may in many cases be tripped before the lockout threshold for a particular account. Each account may have an associated warning threshold. When a particular account's warning threshold is tripped, the account access control component 100 may perform various functions that may in many cases mitigate susceptibility to large-scale lockout attacks, as described in more detail below.

Figure 3:
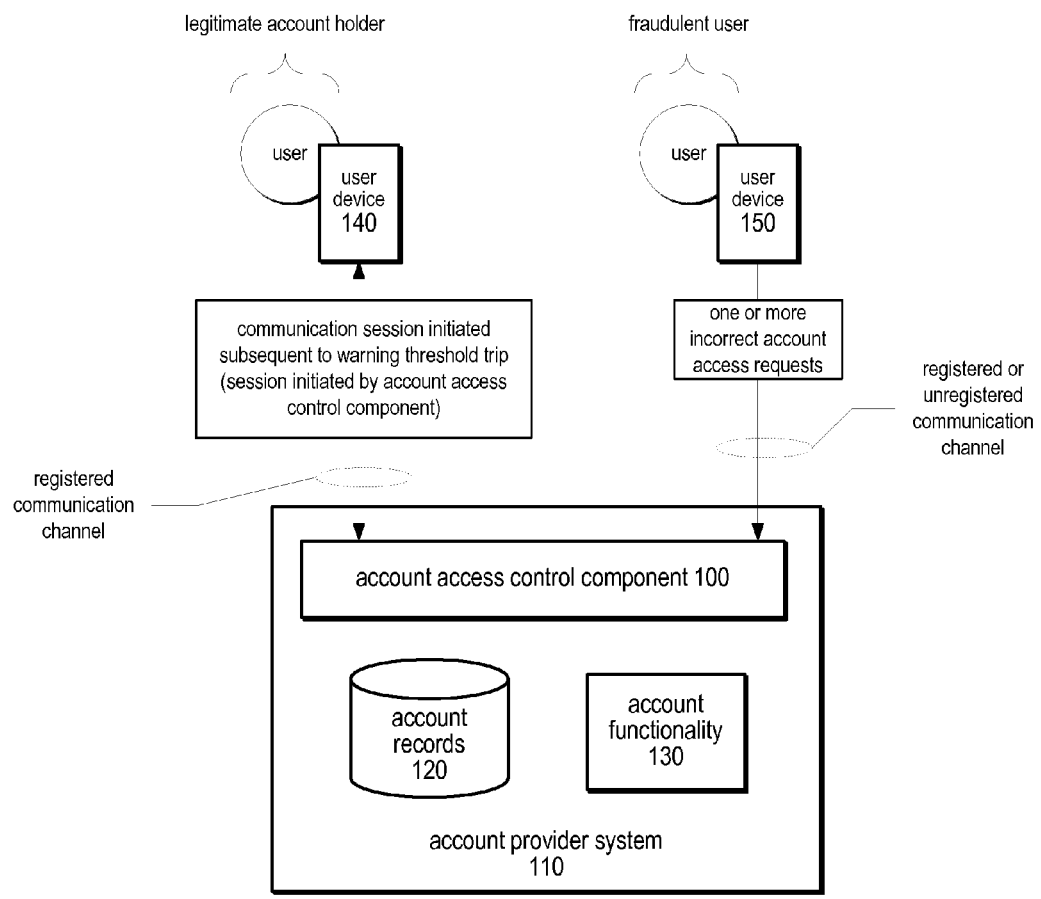
FIG. 3 illustrates an account access control component configured to prevent large-scale account lockout, according to one embodiment.

In some embodiments, when a particular account's count reaches the warning threshold, account access control component 100 may contact the account holder that is associated with the particular account, such as illustrated by the communication session of FIG. 3. In various embodiments, instead of the account holder contacting the account access control component, contact with the account holder may be initiated by the account access control component through a registered communication channel. In this way, the account access control component may ensure that it is not communicating with a fraudulent user since registered communication channels are typically only accessible to the account holder or an individual that the account holder likely trusts (e.g., a family member that shares a home phone number with the individual). When the account access control component establishes communication with the account holder through the registered communication channel, the account access control component may alert the account holder that the warning threshold has been tripped.

During the communication session, the account holder may provide (e.g., through device 140 or another device) the account access control component with a response that indicates whether the threshold was tripped by the account holder or another individual, which may in many cases be a fraudulent user. If the account holder indicates that he is responsible for tripping the warning threshold, such as might occur if the account holder forgets his account password, the account access control component may enable the user to reset his password so that the user can return to using his account as normal. If the account holder indicates that he is not responsible for tripping the warning threshold, such as might occur if a fraudulent user is intentionally trying to trip the lockout threshold, the account access control component 100 may log the event so that a system administrator may investigate the problem and/or track down the fraudulent user. One example of the communication session above might include the account access control component 100 providing the account holder with a recorded message, such as "The warning threshold for your account has been reached. Have you recently attempted to access your account and were unsuccessful? For 'yes,' press 1, for 'no,' press 2." Note that a variety of other prompts or messages could be employed to obtain feedback from the account holder in order to determine whether the tripping of the warning threshold was caused by the account holder or a fraudulent individual.

In various embodiments, in response to determining that a particular account's count has reached the warning threshold, the account access control component may place the user account in a hold state. While the account is placed in the hold state, the account access control component may temporarily ignore or reject account access requests for access to the user account. In this way, when a fraudulent user attempts to lock access to one or more user accounts using the aforementioned attack techniques, the tripping of the warning threshold may result in the account being placed in a hold state instead of a lockout state. When a particular account is placed in the hold state, the account access control component may establish communication with the account holder through a registered communication channel and provide the account holder with access to account information and/or account functionality, such as account records 120 or account functionality 130. In this way, even when one or more accounts of the account provider system are subjected to an attempted lockout attack, such as the attacks described above, the accounts may remain accessible to the legitimate account holders through the registered communication channel.

For example, if a particular account had warning and lockout thresholds of "5 incorrect account access requests" and "10 incorrect access attempts" (respectively), an attacker that attempts to lockout the account by intentionally sending more than 10 incorrect access attempts would be unsuccessful due to the warning threshold. When the attacker's fifth incorrect access attempt is received by the account access control component, the warning threshold is reached and the account access control component may place the account in a hold state as described above. Accordingly, the attacker's sixth and subsequent incorrect access attempts will be ignored or rejected by the account access control component. The account access control component may then contact the account holder though a registered communication channel and provide the account holder with access to account information or account functionality. In one example, when account access control component 100 receives an incorrect account access request for an account that is placed in a hold state, the account access control component may provide the sender of the incorrect account access request with a warning message, such as a message that indicates that: "Account access requests are not being received at this time. If you are the account holder of this account, we will contact you in accordance with your account preferences. You will be provided access to your account at that time." In this manner, an attacker who receives this message may realize that his efforts to lock access to the account are futile. Consequently, the attacker may abandon the attack altogether.

In some cases, the account holder may be unreachable at one or more of his registered communication channels (e.g., the account holder could be on vacation, in an important meeting, or unavailable for some other reason). In these cases, the account holder may not know that his account has been placed in a hold state, so he may attempt to send an account access request to the account access control component even though the account access control component may not accept the account access request. Accordingly, in these cases, the account access control component may be configured to detect the account holder's access request and at that time contact the account holder through a registered communication channel (e.g., to provide the account holder with access to his account). In some cases, the account access control component may inform the account holder of activities that took place while he was unavailable. For instance, when the account holder sends an account access request to the account access control component after being unavailable for a period of time (e.g., the account holder could have been on vacation, in an important meeting, or unavailable for some other reason), the account access control component 100 may provide an account update message (e.g., phone call, email, SMS text message) to the account holder, such as: "While you were unavailable, your account was placed in a hold state. To access your account, please contact us at 1-(800)-555-5555 to indicate that you are now available. We will return your call in accordance with the registered contact information from your account preferences. You may access your account at that time."

In some embodiments, the account access control component 100 may be configured to determine when an attack has subsided (e.g., an attacker gives up due to the effectiveness of the warning threshold). Accordingly, the account access control component may automatically remove the user account from the hold state such that the account holder may again access his account by sending a correct account access request to the account access control component. In some cases, the count of incorrect account access requests may be reset by the account access control component at this time. In other cases, the count may not be reset and subsequent incorrect account access requests may result in the account access control component placing the account in a hold state. In the case where the count is not reset, subsequent incorrect access requests may eventually trip the lockout threshold and the access to the account may be locked for all users (with some exceptions, such as a system administrator).

In some embodiments, the account access control component may be configured to remove the user account from the hold state in response to receiving account verification information from the user through one or more registered communication channels that are associated with the user's account. In some cases, this account verification information may include account verification information (e.g., a mother's maiden name, a security code, a PIN, a password, answers to security questions, etc.) previously registered with the account access control component, such as during an account setup process that is completed before the user begins using their account. In some cases, the account verification information may be information that is different than the authorization information that the user provides to access his account, such as the authorization information included in the account access requests described above.

In various embodiments, in addition to a warning threshold and a lockout threshold, the account access control component may be configured to utilize a session threshold that indicates a maximum number of incorrect account access attempts that may occur during a particular session. The session threshold may in various embodiments be less than the warning threshold as well as the lockout threshold. For instance, some communications between a user and the account access control component may take place during a session, such as a telephone call where the user dials in to the account access control component to access his account. In this case, each call may be considered a session. Accordingly, if the user submits a number of incorrect account access requests that equals the session threshold, the account access control component may end the session (e.g., the telephone call). In this case, to enter another account access request, the user may be required to begin a new session (e.g., dial in to the account access control component again). The use of a session threshold may in various embodiments deter fraudulent users from performing brute force attacks on the account provider system since the time necessary for beginning a new session may increase the computation time for brute force attacks.

In various embodiments, in addition to a warning threshold, the account access control component may be configured to utilize a request rate threshold that indicates a maximum number of incorrect account access attempts may that occur during a particular time period (e.g., a time period chosen by the account access control component or a system administrator). The request rate threshold may in various embodiments be less than the warning threshold as well as the lockout threshold. The account access control component may be configured to temporarily lock access to a user account in response to detecting that the request rate threshold has been tripped. For example, if the request rate threshold were "4 access requests per hour," then the account access control component may temporarily lock the account for 24 hours after detecting 4 or more requests during any particular hour. The use of a request rate threshold may in various embodiments deter fraudulent users from performing brute force attacks on the account provider system since the time in which an account is temporarily locked after the request rate threshold is tripped may increase the computation time for brute force attacks.

Figure 4:
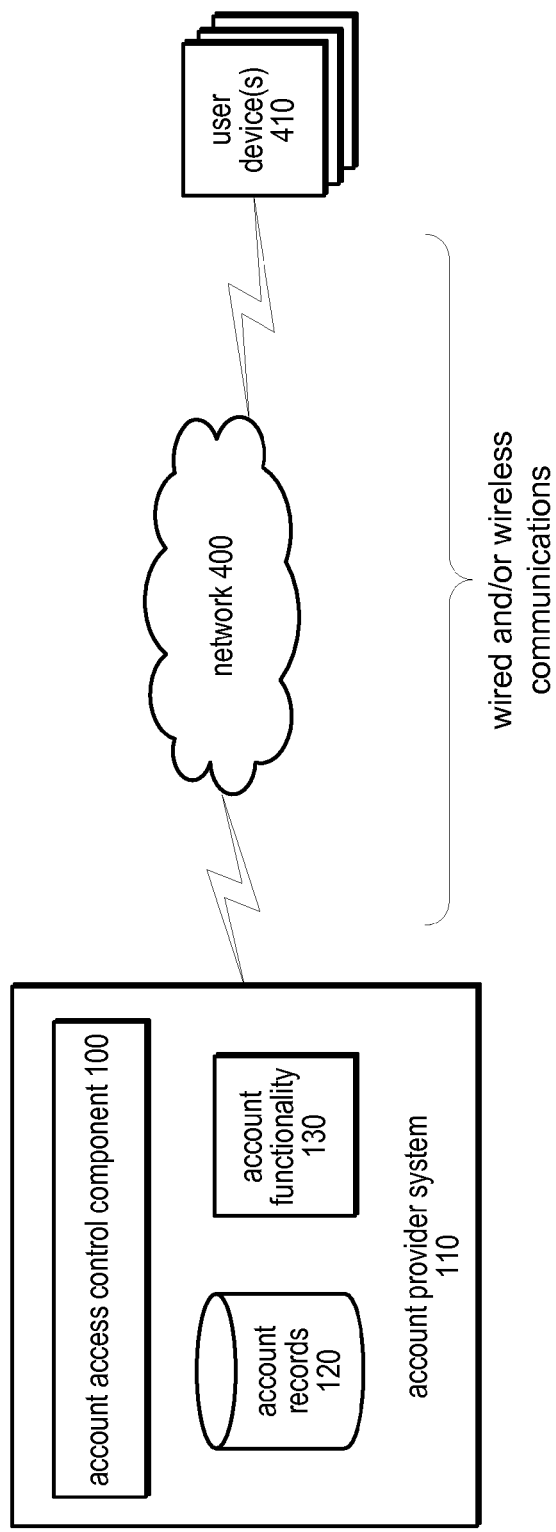
FIG. 4 is an example of a block diagram of a network configuration, according to one embodiment.

The block diagram of FIG. 4 illustrates an example of a system including an account access control component, according to one embodiment. Account provider system 110 may be configured in the same manner as the like numbered elements of FIGS. 1-3. Additionally, user device(s) 410 may represent one or more of user devices 140 and/or user devices 150 as described above. In various embodiments, the account provider system (including account access control component 100) may be communicatively coupled to various user devices through network 400. In various embodiments, network 400 may support wireless communication such as wireless communications over mobile phone (e.g., voice or text messaging) or wireless data networks (e.g., mobile broadband networks or WiFi networks). In some embodiments, one or more portions of network 400 may be any of various computer networks including, but not limited to, Local Area Networks (LANs) (e.g., corporate or Ethernet networks), Wide Area Networks (WANs) (e.g., the Internet), wireless networks, telecommunications networks, or some combination thereof.

Figure 5:
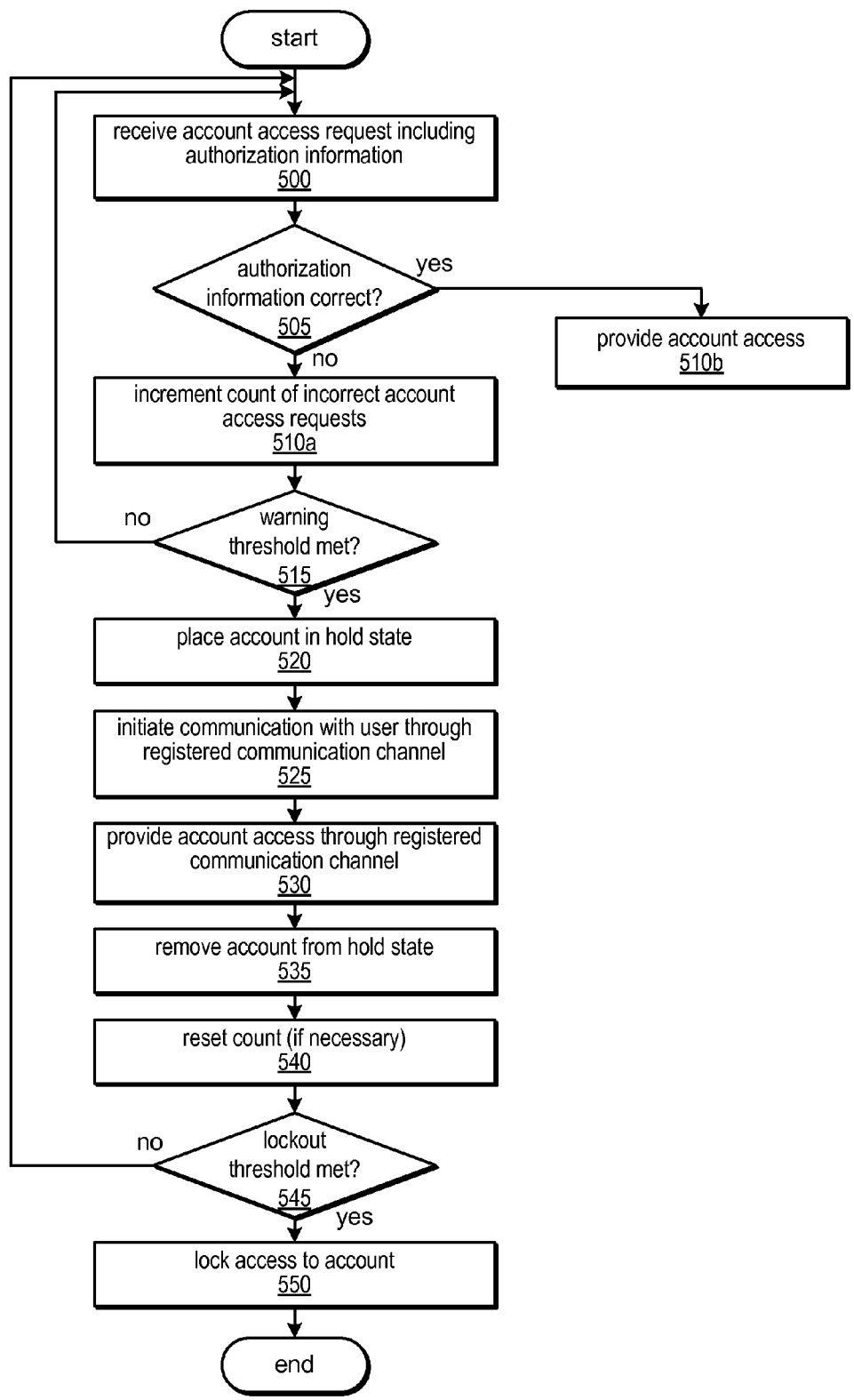
FIG. 5 is an example of a flowchart for a method of processing account access requests in order to prevent large-scale account lockout, according to one embodiment.

The flowchart of FIG. 5 illustrates an example of a method for processing incoming account access requests in a manner that may prevent large-scale lockout attempts. In various embodiments, the method described herein may be performed by account access control component 100. The method may commence with receiving an account access request that includes authorization information, such as the account access requests described above in FIGS. 1-3. For instance, receiving an account access request including authorization information may include receiving a telephone call placed by a user. The authorization information of the phone call may be a username and password (or other security code). In some cases, the method may include determining which account corresponds to the request by accessing an account identifier from the request. Such account identifiers may include usernames, account numbers, and/or caller ID information associated with the telephone call. For example, the method may include comparing caller ID information from the request to caller ID information stored with account preferences to determine an account that corresponds to the caller ID information.

The method may further include determining whether the authorization information of the request is correct, as illustrated by step 505. Such authorization information may include PINs, usernames, passwords, security codes, other security related mechanisms, or some combination thereof. For instance, the method may include determining whether a password or other security code of the request matches a password for the particular account. As illustrated by step 510*b*, if the authorization information is correct, the method may include providing account access to the user that provided the account access request. If the authorization information is incorrect, as illustrated by step 510*a*, the method may include incrementing a count that indicates the number of incorrect account access requests received for the account. In this way, the method may include dynamically tracking how many incorrect access requests have been received at any particular point in time. Note that the method may include incrementing the count account irrespective of whether the requests are received from legitimate account holders (e.g., the user of user device 140) or fraudulent users (e.g., the user of user device 150).

As illustrated by step 515, the method may include determining whether a warning threshold has been met, which may include determining if the number of incorrect account access attempts (e.g., as indicated by the count) is equal to (or greater than) a warning threshold. The warning threshold may in some embodiments indicate a number of received incorrect account access requests that is less than or equal to the lockout threshold described above. As described above, the warning threshold may in many cases be tripped before a lockout threshold (see e.g., step 545) and thus prevent the lockout of the account. In this way, utilizing the method described may ward off various attacks aimed at fraudulently locking access to user accounts.

In some embodiments, the method may include placing the account associated with the access request in a hold state. Placing an account in a hold state may include rejecting or ignoring subsequent access requests. In this way, while an account is placed in a hold state, an ongoing attack on the user account will not be effective. For instance, if an attacker repeatedly sends incorrect account access requests (e.g., as illustrated in FIG. 3), the method may include ignoring or rejecting such requests. Accordingly, the count is not increased by such requests, and an attacker will be unable to trip the lockout threshold for the account. In other words, the method may include placing the account in a hold state to prevent an account holder from losing access to his account due to attacks from fraudulent users. Note that in some embodiments, a hold state may not be employed and the method may proceed to step 525.

As illustrated by step 525, the method may include initiating communication with the account holder through a registered communication channel. As described above, a registered communication channel may be a communication channel previously registered by the user for the account. For instance, the method may include receiving information for reliably contacting the account holder (e.g., receiving such information during an account setup process) and using such information to initiate communication with the user. For instance, the method may include receiving a phone number, email address, or other contact information for contacting the account holder. In some cases, each registered communication channel may have a priority ranking such that when multiple registered communication channels are present, the method may include attempting to initiate communication through the highest priority registered communication channel. If the user cannot be reached at the highest priority registered communication channel, the method may include attempting to initiate communication through the next highest priority channel and so forth.

In some cases, the account holder may be unreachable at each of his registered communication channels. Accordingly, the account holder may not know that his account has been placed in a hold state. The account holder may attempt to send an account access request to the account access control component even though the account access control component may not accept the account access request. Accordingly, in these cases, the method may include detecting the account holder's access request and at that time contacting the account holder through a registered communication channel (e.g., to provide the account holder with access to his account). In some cases, the method may include informing the account holder of activities that took place while he was unavailable. For instance, when the account holder sends an account access request to the account access control component after being unavailable for a period of time (e.g., the account holder could have been on vacation, in an important meeting, or unavailable for some other reason), the method may include providing an account update message to the account holder, such as: "While you were unavailable, your account was placed in a hold state. To access your account, please contact us at 1-(800)-555-5555 to indicate that you are now available. We will return your call in accordance with the registered contact information from your account preferences. You may access your account at that time."

As illustrated by block 530, the method may include providing account access to the account holder through a registered communication channel. For example, the method may include providing the account holder with a telephone menu of options such that the account holder may access account information (e.g., check account balances, contact information, appointment times, and other account related information) or perform various account functions (e.g., sending or receiving a payment, making a purchase, and other account related functionality). In one embodiment, providing the account holder access to his account may include sending (e.g., via email or other electronic method) an account holder a custom hyperlink that directs the account holder to a web page for accessing his account. In some cases, the requisite authorization information (e.g., a passcode or security token) may be embedded within the hyperlink such that the account holder does not have to supply any additional authorization information in order to access his account.

During communication with the account holder, the method may in some embodiments include determining whether the threshold was tripped by the account holder or another individual, which may in many cases be a fraudulent user. If the account holder indicates that he is responsible for tripping the warning threshold, such as might occur if the account holder forgets his account password, the method may include enabling the user to reset his password so that the user can return to using his account as normal. If the account holder indicates that he is not responsible for tripping the warning threshold, such as might occur if a fraudulent user is intentionally trying to trip the lockout threshold, the method may include logging the event so that a system administrator may investigate the problem and/or track down the fraudulent user. One example of determining whether the threshold was tripped by the account holder or another individual may include providing the account holder with a warning message, such as "The warning threshold for your account has been reached. Have you recently attempted to access your account and were unsuccessful? For 'yes,' press 1, for 'no,' press 2." Note that the method may include using a variety of other prompts or messages to obtain feedback from the account holder.

In some embodiments, the method may include determining when an attack has subsided (e.g., an attacker gives up due to the effectiveness of the warning threshold). Accordingly, the method may include automatically removing the user account from the hold state such that the account holder may again access his account by sending a correct account access request to the account access control component, such as illustrated by step 535. In some embodiments, removing the user account from the hold state may be performed in response to receiving account verification information from the user through one or more registered communication channels that are associated with the user's account. In some cases, this account verification information may include account verification information (e.g., a mother's maiden name, a security code, a PIN, a password, answers to security questions, etc.) previously registered during an account setup process that is completed before the user begins using their account. In some cases, the account verification information may be information that is different than the authorization information that the user provides to access his account, such as the authorization information included in the account access requests described above.

In some cases, the method may include resetting the count of incorrect account access requests at this time, such as illustrated by step 540. In other cases, the count may not be reset and subsequent incorrect account access requests may result in the account access control component placing the account in a locked state. In the case where the count is not reset, subsequent incorrect access requests may in some cases trip the lockout threshold and the method may include locking access to the account for all users (with some exceptions, such as a system administrator). Accordingly, the method may include determining whether the lockout threshold has been met, as illustrated by step 545. If the lockout threshold has not been met, the method may continue to process incoming account access requests, as illustrated by the negative output of step 545. If the lockout threshold has been met, the method may include locking access to the account (for account holders and fraudulent users alike), as illustrated by step 550. In some embodiments, the method may include providing one or more unlock mechanisms to unlock a locked account. For example, the method may include prompting the user with a series of authorization questions. In such cases, the authorization questions may in some embodiments prompt the account holder to provide more verification or security information than is required when accessing his account. For instance, instead of a username and password, the method may include receiving from the user a username, password, and a separate security code.

Figure 6A:
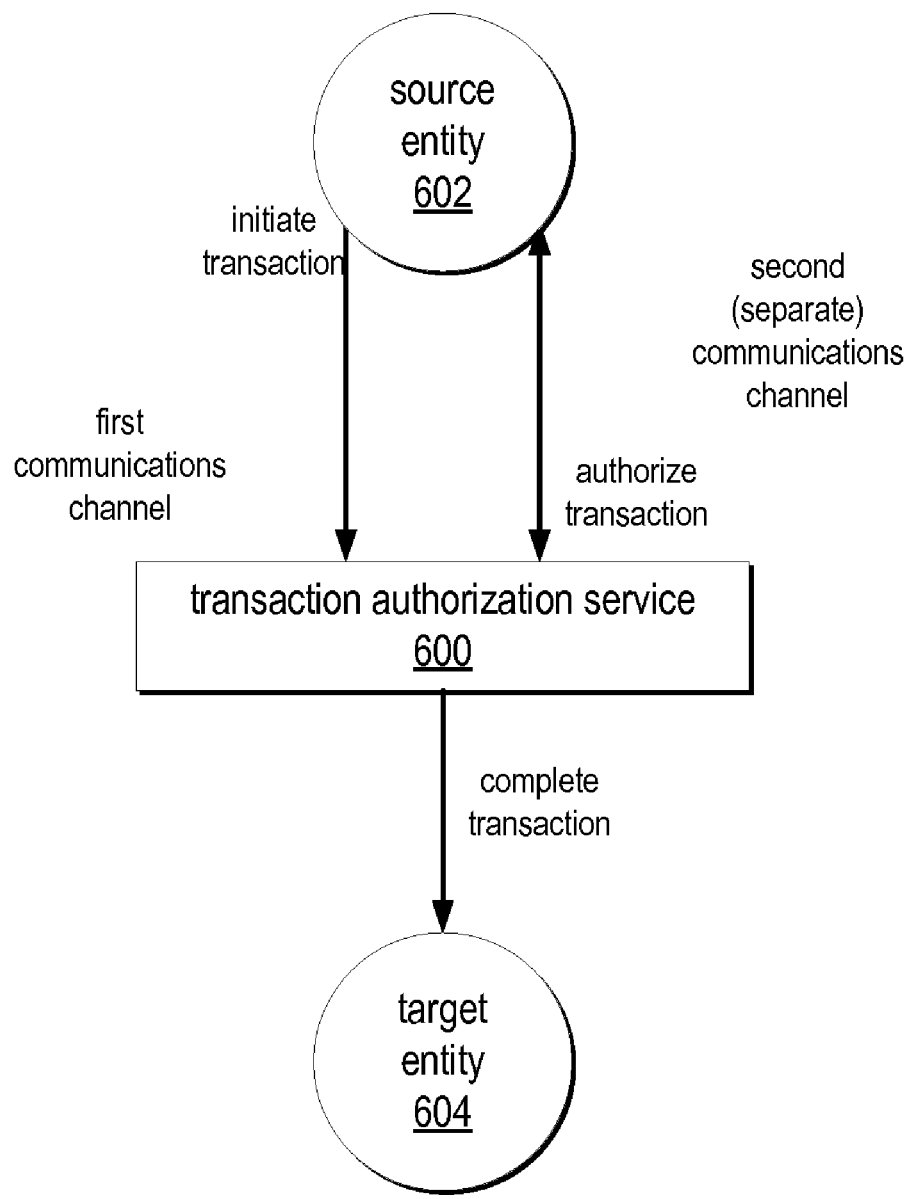
FIG. 6A illustrates a transaction authorization service, according to one embodiment.

FIG. 6A illustrates a transaction authorization service according to one embodiment. In one embodiment, a first, or source, entity 602 may initiate a transaction (e.g., a payment or money transfer) to a second, or target, entity 604 with a transaction authorization service 600 via a first communication channel, for example a telephone call via a conventional land-based telephone, a telephone call via a mobile/cellular phone, a text message initiated from a cell phone or other device capable of text messaging, an email message, or over some other communications channel.

The transaction initiation message may include information that may be used to identify the source entity 602, or may otherwise be identifiable as being from the particular entity. In some embodiments, the transaction authorization service 600 may identify the transaction initiation message as authentic (as being from the source entity) via one or more methods. For example, in one embodiment, caller ID may be used to identify the transaction initiation message as authentic. In one embodiment, the transaction initiation message may include a security phrase or other identifier known only to the source entity and to the transaction authorization service. Other methods for identifying the transaction initiation message as authentic may be used in various embodiments. The transaction initiation message may also include, but is not limited to, information identifying the target entity or entities (e.g., a telephone number, account number, email address, alias, etc.), and an amount to be paid or transferred to the target entity(s).

Before completing the transaction to the target entity 604, the transaction authorization service 600 authorizes the transaction with the source entity 602 via communications through a second and separate communications channel, for example a telephone call to a cell phone, standard telephone, PDA, or other device capable of telephone communications, via a text message to a text-message-capable device in possession of the source entity 602, or through some other communications channel. Note that the initiation of the transaction and the authorization of the transaction may be, but are not necessarily, performed by the source entity 602 using the same device (e.g., a cell phone), but that two different communications channels are used.

The communication (e.g., a message, or authorization request) from the transaction authorization service 600 via the separate communications channel may include an indication that the message is authentic (e.g., is from the transaction authorization service 600). The source entity 602 may authorize the transaction by providing a code or identifier associated with the source entity and known by the transaction authorization service 600 via the second communications channel in response to the authorization request, for example by entering a Personal Identification Number (PIN) or other identifier on the keypad of a cell phone or other device on which the authorization message was received. After receiving the response from the source entity 602 including a PIN or other identifier, the transaction authorization service 600 may verify that the PIN or other identifier provided by the source entity 602 is valid, for example by checking the provided identifier against an identifier provided by the source entity during a registration process for the transaction authorization service. If the provided PIN or other identifier is not valid, then the transaction is not considered authorized by the transaction authorization service 600. The authorization through the separate communications channel serves to securely verify that the transaction was initiated and is authorized by the source entity 602.

Note that, in various embodiments, the identifier or code entered or otherwise provided by the source entity 602 to authorize a transaction may be a PIN number (e.g., a 4-digit numeric code), some other type of alphanumeric code, a password, a pass phrase, a response to a personal question (e.g., "What is your mother's maiden name?"), or any other form of identifier that can be transmitted over a communications channel. One of ordinary skill in the art will recognize that any of a variety of types of identifiers may be used to identify a source entity. Further note that other forms of identification are possible and contemplated. As an example, some embodiments using voice communications as the separate communications channel to authenticate transactions may use voice recognition in authenticating the transactions. In these embodiments, the transaction authorization service may analyze the source entity's voice input to determine if the source entity 602 is recognized, and may then (if recognized) ask a question along the lines of "Do you authorize this transaction?" The source entity 602 may then respond "Yes" or "No" to authorize or reject the transaction.

After the transaction has been authorized through the second communications channel, the transaction authorization service 600 may notify the target entity 604 of the transaction. The notification message may include an indication that the notification message is authentic (e.g., is from the transaction authorization service 600). The target entity 604 may then complete the transaction with the transaction authorization service 600, for example by communicating with the transaction authorization service 600 to receive a payment or a transferal of funds initiated by the first entity 602.

Note that the transaction authorization service 600 may be used to perform the actual funds transfer for the transaction, and thus may provide accounts for funds transfer to various entities which may include either one or both of source entity 602 and target entity 602, or alternatively the transaction authorization service 600 may serve as an authorization service for one or more other services that perform the actual funds transfer.

Further note that the source entity 602 and/or the target entity 604 may represent individuals or corporate entities, such as organizations, businesses, retail businesses, industrial enterprises, e-commerce businesses, governmental entities, or in general any two entities between which a transaction may take place. Further note that the transaction may be a payment for goods or services, a money or other commodity transfer, a payment or transfer for other purposes (e.g., for tax purposes), or in general any transaction involving the transferal of a commodity from one entity to another. Further note that embodiments may be used for other purposes than for authorization of transfers of commodities, for example for authorizing the scheduling, allocation, or transferal of resources, for scheduling and responding to meetings, etc.

Using a second, separate communications channel to authorize a transaction initiated via a first communications channel may help to insure the security of the transaction, and of the source entity's account. For example, if someone is somehow eavesdropping on the first communications channel used to initiate the transaction, authorizing the transaction through a second, separate communications channel may help to prevent that person from interfering with the transaction, or from gaining additional information (e.g., a PIN number or other identifier) that might allow that person access to the source entity's account. In addition, in embodiments, the second communications channel may be specified by a telephone number, alias, or other type of address that is assigned to a particular physical device, for example a conventional phone, a cell phone, or other personal electronic device. This device is, or should be, associated with and in the possession of the source entity, for example the source entity's home phone, personal cell phone or other personal electronic device. This may help to provide two form factor security for transactions. Not only must the source entity possess some knowledge (e.g., a PIN number or other identifier) that is necessary to authorize transactions, but the source entity must also be in possession of the device associated with the second communications channel (e.g. a particular cell phone associated with a cell phone number) to authorize transactions. To authorize a transaction, an entity must be in possession of the mechanism to participate on the second communication channel as well as the PIN number or other identifier used in authorizing the transaction.

Figure 6B:
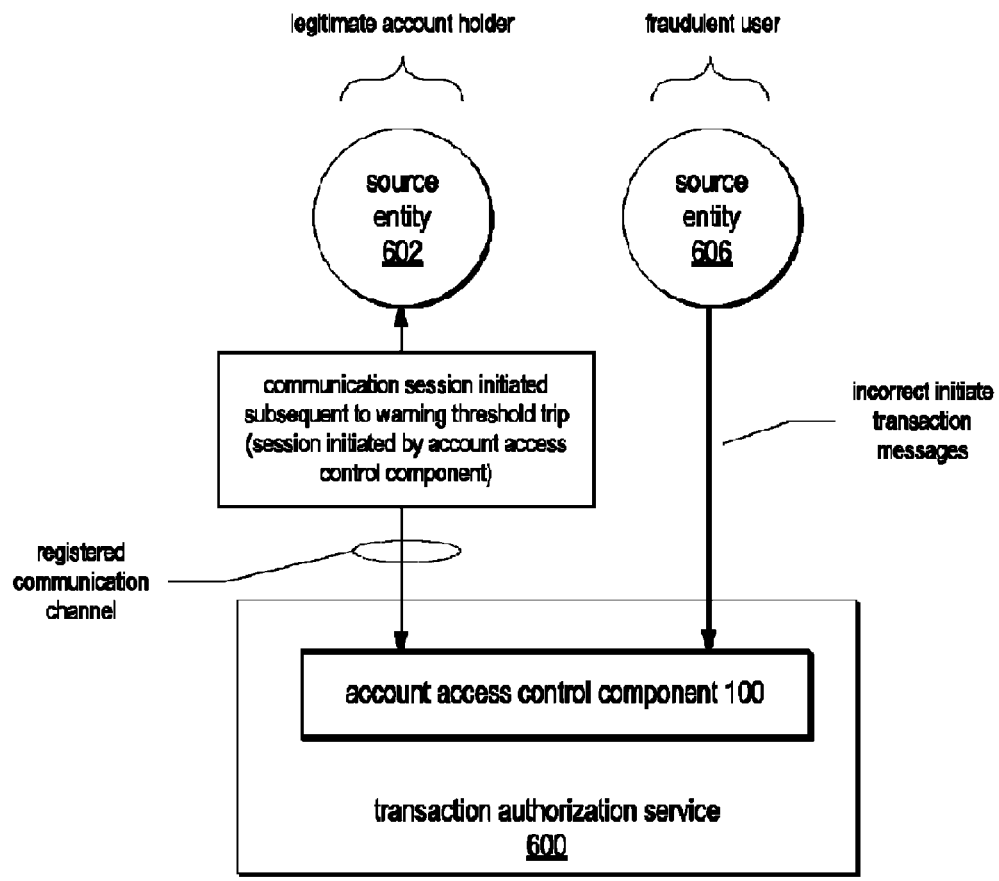
FIG. 6B illustrates an account access control component and a transaction authorization service, according to one embodiment.

As illustrated by FIG. 6B, account access control component 100 may in various embodiments be implemented within a transaction authorization service, such as transaction authorization service 600. In the illustrated embodiment, source entity 606 may be a fraudulent user attempting to lockout one or more accounts serviced by the transaction authorization service, such as a transaction account associated with source entity 602. To attempt to perform such an attack, source entity 606 may send multiple incorrect initiate transaction messages to the account access control component of the transaction authorization service. Each initiate transaction message may be analogous to the account access requests described above. As described above, each initiate transaction message may include information that identifies the entity (e.g., a username or caller ID information). Source entity 606 may spoof such information and provide the information and an incorrect password to account access control component 100 in an attempt to trip the lockout threshold thereby preventing source entity 602 from accessing its account. Source entity 606 may use any of the attacks, such as brute force attacks, war dialing techniques, or dictionary attacks, as described above.

However, as described above, account access control component may employ a warning threshold that is less than or equal to the lockout threshold. Accordingly, the warning threshold may be tripped before the lockout threshold. When the warning threshold is tripped by source entity 606's attack, the account access control component may initiate a communication session with source entity 602 through a registered communication channel. In this way, the account access control component may ensure that communication has not been established with a fraudulent entity. In some embodiments, the account access control component 100 may be configured to place source entity 602's account in a hold state, such as the hold state described above. When the account is placed in a hold state, the account access control component 100 may ignore or reject additional initiate transaction messages from fraudulent entities and legitimate account holding entities alike. The account access control component may also be configured to provide account access, such as the ability to complete a financial transaction, to the source entity through the registered communication channel during the communication session that has been initiated. In this way, the legitimate account holding entity may receive account access (e.g., such as completing a transaction as illustrated in FIG. 6A) while further attacks from fraudulent entities are rendered ineffective or mitigated altogether.

Various embodiments of a system and method for preventing large-scale account lockout, as described herein, may be executed on one or more computer systems, which may interact with various other devices. One such computer system is computer system 700 illustrated by FIG. 7. Computer system 700 may be capable of implementing an account access control component as illustrated by account access control component 100. Computer system 700 may also be capable of storing data, such as data 125. In the illustrated embodiment, computer system 700 includes one or more processors 710 coupled to a system memory 720 via an input/output (I/O) interface 730. Computer system 700 may further include a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions, such as program instructions 722, and data implementing an account access control component, such as account access control component 100 described above, are shown stored within system memory 720. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data (e.g., account access requests) to be exchanged between computer system 700 and other devices attached to a network (e.g., network 400), such as other systems (e.g., user device 140 or user device 150), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
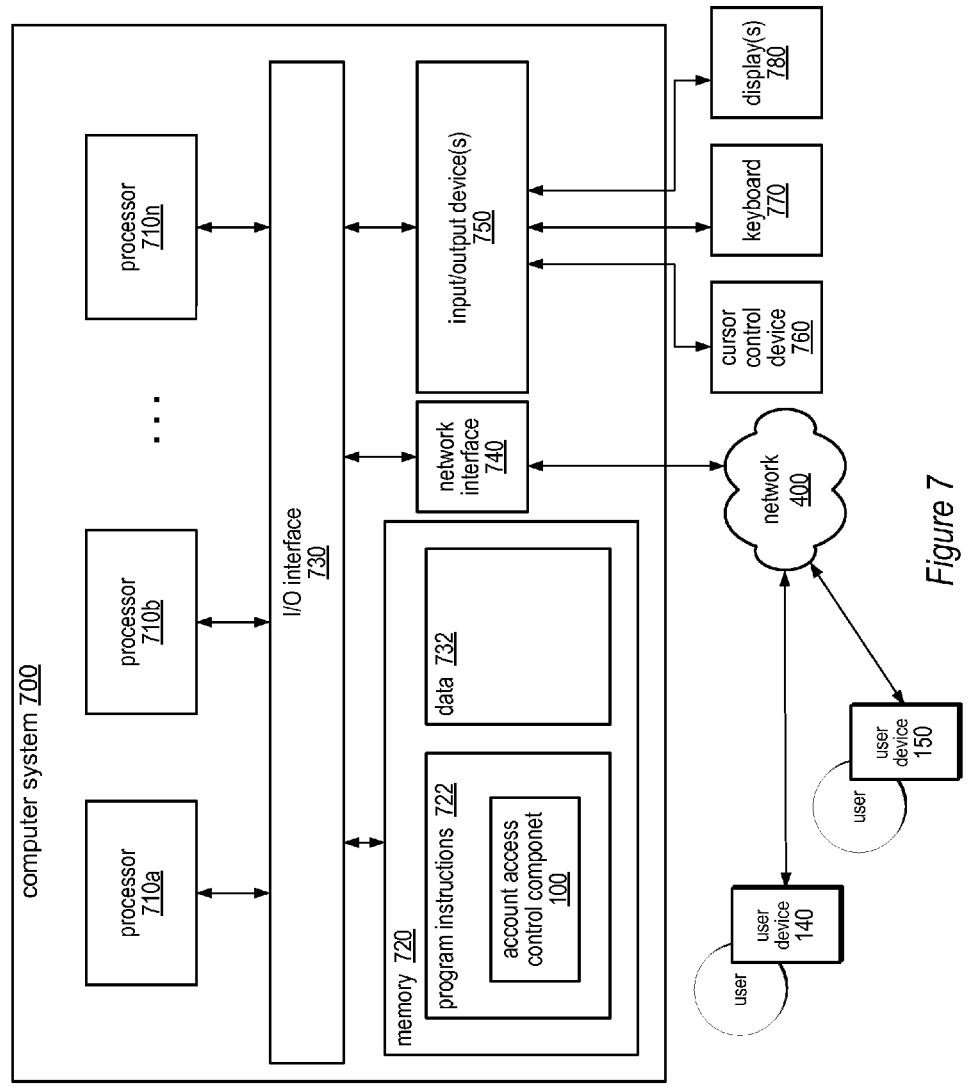
FIG. 7 illustrates a computing system suitable for implementing various system components for preventing large-scale account lockout, according to one embodiment.

As shown in FIG. 7, memory 720 may include program instructions 722 configured to implement an account access control component, such as account access control component 100. Memory 720 may also include data 732 including various types of data, such as the account records described above. In one embodiment, account access control component may be configured to implement the method described in regard to FIG. 5. In other embodiments, different elements and data may be included.

Those skilled in the art will appreciate that computer system 700 is merely illustrative and is not intended to limit the scope of the present embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments presented herein may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method(s) may be changed, and various elements may be added, reordered, combined, omitted, modified, etc. Various modifications and changes may be made as would be obvious to a person skilled in the art having the benefit of this disclosure.

Realizations in accordance with the embodiments presented herein have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the configuration examples may be implemented as a combined structure or component. These and other variations, modifications, additions, and improvements may fall within the scope of embodiments as defined in the claims that follow.

What is claimed is:

1. A system for preventing large-scale account lockout, the system comprising:
   a processor;
   a memory coupled to the processor, wherein the memory comprises program instructions executable by the processor to:
   receive one or more access requests for access to a user account associated with a user, wherein each access request includes an authorization code;
   provide a count that indicates a number of incorrect account access requests that have been received, wherein each incorrect access request is one of said one or more access requests indicating an incorrect authorization code;
   in response to determining that the count has reached a warning threshold that specifies a plurality of incorrect account access requests have been received, the warning threshold being less than a lockout threshold:
      contact the user through a registered communication channel to alert the user that the warning threshold has been reached, wherein the registered communication channel is a communication channel specified by the user prior to said receiving one or more access requests; and
      to prevent an attacker from locking access to the user account, place the user account in a hold state such that additional correct and incorrect access requests for the user account that are received while the user account is in the hold state are rejected, the hold state being removable responsive to receipt of valid account verification information;
   subsequent to contacting the user and while the user account is in the hold state, receive account verification information specified by the user after being alerted;
   in response to determining the received account verification information is valid, remove the user account from the hold state; and
   in response to determining that the count has reached the lockout threshold, lock access to the user account such that unlocking the user account requires a different set of verification information than is required to remove the user account from the hold state.

2. The system of claim 1, wherein, while the account is placed in the hold state, the program instructions are executable to provide the user access to the user account through the registered communication channel.

3. The system of claim 2, wherein to provide the user access to the user account the program instructions are executable to enable the user to complete a transaction through the registered communication channel while the account is placed in the hold state.

4. The system of claim 1, wherein program instructions are configured to receive account verification information from the user through said registered communication channel, wherein said account verification information includes information specified by the user prior to said receiving one or more access requests.

5. The system of claim 1, wherein, subsequent to alerting the user that the warning threshold has been reached, the program instructions are executable to reset the count to prevent the count from reaching the lockout threshold.

6. The system of claim 1, wherein the program instructions are further executable to:
   in response to determining that the count has reached a session threshold that indicates a number of incorrect account access requests received during a current session between the system and the user, cancel the current session.

7. The system of claim 1, wherein the program instructions are further executable to:
   in response to determining that the count has reached an initial threshold that indicates a number of incorrect account access requests received during a previously specified time period, temporarily lock access to the user account.

8. A method for preventing large-scale account lockout, the method comprising:
   receiving one or more access requests for access to a user account associated with a user, wherein each access request includes an authorization code;
   providing a count that indicates a number of incorrect account access requests that have been received, wherein each incorrect access request is one of said one or more access requests indicating an incorrect authorization code;
   in response to determining that the count has reached a warning threshold that specifies a plurality of incorrect account access requests have been received, the warning threshold being less than a lockout threshold:
      contacting the user through a registered communication channel to alert the user that the warning threshold has been reached, wherein the registered communication channel is a communication channel specified by the user prior to said receiving one or more access requests; and
      to prevent an attacker from locking access to the user account, placing the user account in a hold state such that additional correct and incorrect access requests for the user account that are received while the user account is in the hold state are rejected, the hold state being removable responsive to receipt of valid account verification information;
   subsequent to contacting the user and while the user account is in the hold state, receiving account verification information specified by the user after being alerted;
   in response to determining the received account verification information is valid, removing the user account from the hold state; and
   providing a lock component configured to, in response to determining that the count has reached the lockout threshold, lock access to the user account such that unlocking the user account requires a different set of verification information than is required to remove the user account from the hold state.

9. The method of claim 8, further comprising providing the user access to the user account through the registered communication channel while the user account is placed in the hold state.

10. The method of claim 9, further comprising enabling the user to complete a transaction through the registered communication channel while the user account is placed in the hold state.

11. The method of claim 8, further comprising, receiving the account verification information from the user through said registered communication channel, wherein said account verification information includes information specified by the user prior to said receiving one or more access requests.

12. The method of claim 8, further comprising, subsequent to alerting the user that the warning threshold has been reached, resetting the count to prevent the count from reaching the lockout threshold.

13. The method of claim 8, further comprising:
in response to determining that the count has reached a session threshold that indicates a number of incorrect account access requests received during a current session between the system and the user, canceling the current session.

14. The method of claim 8, further comprising:
in response to determining that the count has reached an initial threshold that indicates a number of incorrect account access requests received during a previously specified time period, temporarily locking access to the user account.

15. A non-transitory computer-readable storage medium, comprising program instructions computer-executable to:
receive one or more access requests for access to a user account associated with a user, wherein each access request includes an authorization code;
provide a count that indicates a number of incorrect account access requests that have been received, wherein each incorrect access request is one of said one or more access requests indicating an incorrect authorization code;
in response to determining that the count has reached a warning threshold that specifies a plurality of incorrect account access requests have been received, the warning threshold being less than a lockout threshold:
contact the user through a registered communication channel to alert the user that the warning threshold has been reached, wherein the registered communication channel is a communication channel specified by the user prior to said receiving one or more access requests; and
to prevent an attacker from locking access to the user account, place the user account in a hold state such that additional correct and incorrect access requests for the user account that are received while the user account is in the hold state are rejected, the hold state being removable responsive to receipt of valid account verification information;
subsequent to contacting the user and while the user account is in the hold state, receive account verification information specified by the user after being alerted;
in response to determining the received account verification information is valid, remove the user account from the hold state; and
provide a lock component configured to, in response to determining that the count has reached the lockout threshold, lock access to the user account such that unlocking the user account requires a different set of verification information than is required to remove the user account from the hold state.

16. The medium of claim 15, wherein the program instructions are further executable to provide the user access to the user account through the registered communication channel while the user account is placed in the hold state.

17. The medium of claim 16, wherein the program instructions are further executable to enable the user to complete a transaction through the registered communication channel while the user account is placed in the hold state.

18. The medium of claim 15, wherein the program instruction are further executable to receive account verification information from the user through said registered communication channel, wherein said account verification information includes information specified by the user prior to said receiving one or more access requests.

19. The medium of claim 15, wherein the program instruction are further executable to, subsequent to alerting the user that the warning threshold has been reached, reset the count to prevent the count from reaching the lockout threshold.

20. The medium of claim 15, wherein the program instructions are further executable to:
in response to determining that the count has reached a session threshold that indicates a number of incorrect account access requests received during a current session between the system and the user, cancel the current session.

21. The medium of claim 15, wherein the program instructions are further executable to:
in response to determining that the count has reached an initial threshold that indicates a number of incorrect account access requests received during a previously specified time period, temporarily lock access to the user account.

* * * * *